(12) United States Patent
Bruso et al.

(10) Patent No.: US 7,972,408 B2
(45) Date of Patent: Jul. 5, 2011

(54) PROCESS AND APPARATUS FOR FURTHER PROCESSING OF SEWAGE SLUDGE AND OTHER MATERIALS TO REDUCE PATHOGENS AND TOXINS

(76) Inventors: Bruce L. Bruso, Hegins, PA (US);
Gerry D. Getman, McMurray, PA (US)

( * ) Notice: Subject to any disclaimer, the term of this patent is extended or adjusted under 35 U.S.C. 154(b) by 1314 days.

(21) Appl. No.: 10/557,941

(22) PCT Filed: May 20, 2004

(86) PCT No.: PCT/US2004/016109
§ 371 (c)(1),
(2), (4) Date: Sep. 29, 2006

(87) PCT Pub. No.: WO2004/105974
PCT Pub. Date: Dec. 9, 2004

(65) Prior Publication Data
US 2007/0023342 A1 Feb. 1, 2007

Related U.S. Application Data

(60) Provisional application No. 60/473,439, filed on May 22, 2003.

(51) Int. Cl.
*C05B 9/00* (2006.01)
*C02F 1/68* (2006.01)
*A62D 3/36* (2007.01)
*C05C 5/00* (2006.01)
*C05D 9/00* (2006.01)
*C05D 1/02* (2006.01)
*B09C 1/08* (2006.01)

(52) U.S. Cl. ......... 71/34; 71/58; 71/59; 71/63; 210/764; 405/128.5; 588/318

(58) Field of Classification Search .................. 210/764; 588/318; 71/34, 58, 59, 63; 405/128.5
See application file for complete search history.

(56) References Cited

U.S. PATENT DOCUMENTS

| | | | |
|---|---|---|---|
| 3,841,464 A | 10/1974 | Tome | 198/115 |
| 4,028,087 A | 6/1977 | Schultz et al. | 71/25 |
| 5,232,584 A | 8/1993 | Wang et al. | 210/139 |
| 5,272,833 A | 12/1993 | Prill et al. | 47/1.42 |
| 5,613,238 A | 3/1997 | Mouk et al. | 588/1 |
| 5,916,448 A * | 6/1999 | Fergen | 210/723 |
| 6,517,599 B2 * | 2/2003 | Gilbert | 71/15 |
| 7,008,538 B2 * | 3/2006 | Kasparian et al. | 210/610 |
| 2003/0084693 A1* | 5/2003 | Sower | 71/11 |
| 2008/0000279 A1* | 1/2008 | Faulmann et al. | 71/12 |

* cited by examiner

*Primary Examiner* — Wayne Langel
(74) *Attorney, Agent, or Firm* — Drinker Biddle & Reath LLP

(57) ABSTRACT

An apparatus and a method for treating a composition containing toxic materials or biosolids, wherein the apparatus has a hydraulically sealable top that can be opened to allow loading of the composition or closed to seal the apparatus. The apparatus also includes a reagent injection system for injecting a reagent into the apparatus, a mixing device for mixing the composition with the reagent, a heater system for heating the composition, or the mixture of the composition and the reagent, an internal vapor recovery system for recovering gases, vapors, and odors from the toxic materials or biosolids, or from the reagents, a reagent recovery system for recovering the reagent after it has been mixed with the composition, a discharge mechanism for discharging the treated composition, and a control panel comprising temperature and pressure measurements.

7 Claims, 6 Drawing Sheets

PROCESS AND APPARATUS FOR FURTHER PROCESSING OF SEWAGE SLUDGE AND OTHER MATERIALS TO REDUCE PATHOGENS AND TOXINS

This application claims a priority filing date based upon provisional patent application 60/473,439 titled "Process And Apparatus For Remediation Of Sites And Materials Contaminated With Toxic Materials Or Biohazards," filed May 22, 2003.

FIELD OF THE INVENTION

The invention relates to the processing of sewage sludge and other contaminated substrates. The invention also relates to an apparatus used to remove toxins from and destroy pathogens in Biosolids and other substrates.

BACKGROUND OF THE INVENTION

In response to concerns about water quality degradation, communities have constructed wastewater and sewage treatment systems. These treatment facilities discharge water of greatly improved quality, but create a solid waste material in the form of sewage sludge. The sludge may be substantially dried by a sludge dewatering press or other means to leave a moist, soil-like residue that is termed "Biosolids" by the U.S. Environmental Protection Agency. Other potential sources of residue similar to sewer sludge Biosolids are food processing facilities where the residue of food production matter is reduced to sludge, and livestock operations where the animal waste is processed to sludge.

In general, Biosolids are nutrient-rich organic residual solids. When properly treated and processed, Biosolids can be recycled and applied as agricultural fertilizer and in other land applications. Environmental regulations set the criteria for use of Biosolids in such land applications, dependant in large part upon the amount and type of pathogen reduction accomplished by the sewage treatment.

Not all municipal sewage facilities are able to accomplish the level of treatment required to produce a Biosolid for use as a fertilizer or in other high level land applications. In addition, some facilities may only be able to achieve the requisite treatment under normal or below normal conditions, but not able to do so under peak loading or abnormal conditions. Sewage treatment usually involves, among other stages, a primary treatment of filtering suspended solids from the influent wastewater and a secondary treatment of decomposing the organic solids by predatory microbes to destroy fecal coliforms and other pathogens. The facilities may not be adequately equipped to remove toxic metals and other hazardous organics that may be present in the wastewater. This frequently presents a problem in communities where stormwater sewers are combined with the sanitary sewers. These combined sewers collect storm runoff conveying additional contaminants, such as solid debris, chemicals and pesticides that enter the sewer treatment system. Contaminants that are not decomposed by predatory microbes or removed in some other step are retained in the Biosolids. In addition, the increased volume of water runoff may overburden the microbe decomposition capacity. Either condition can produce Biosolids that do not meet the criteria for use as fertilizer. The facilities must then contract with properly licensed haulers to have the Biosolids removed to another treatment facility for incineration or other special handling.

It is known to use liquid ammonia as a solvent and washing agent to separate heavy metals and other organic toxins from soil-like substrates. For, example, U.S. Pat. No. 6,049,021 to Getman, et al. discloses methods for separating toxins and heavy metals from various substrates in a pressure vessel using liquid ammonia or another nitrogenous base to wash the contaminants from the carrier material. It is also known that ammonia is effective in destroying microorganisms. While ammonia and other nitrogenous compounds are usually reduced from wastewater at sewage plant, in a preliminary treatment before microbial decomposition to reduce the oxygen demand, ammonia could be used in a post-dewatering process for additional pathogen reduction.

It is also known to use thermal stripping by hot air injection and vapor recovery to reduce volatile contaminants from soil. A mobile apparatus and method for doing this in-situ is disclosed in U.S. Pat. Nos. 5,631,160 and 5,830,752 respectively.

Accordingly, there is a need in many instances for sewage facilities to have additional methods and equipment to treat Biosolids in order to meet criteria for land applications and use as agricultural fertilizer. It would be useful to have methods using the same equipment be able to effectively treat the Biosolids for the elimination of hazardous material, such as heavy metals, PCBs, pesticides, volatile organics and other toxins in addition to reducing pathogenic microorganisms. It would further be useful to have the same equipment be able to effectively treat other contaminated substrates such as sludge, sediment, soil or debris contaminated with toxic materials in addition to treating Biosolids.

SUMMARY OF THE INVENTION

The invention includes methods to further reduce pathogens in Biosolids to produce material acceptable as agricultural fertilizer and disposable by land applications. The methods are carried out in an apparatus that may also be used to the treat BioSolids or other substrate material to reduce metals and other toxins. The apparatus includes a pressure sealable treatment vessel to adjust internal pressure above or below atmospheric pressure as needed in the particular method. The apparatus also has a reagent injection system for injecting a reagent, such as anhydrous ammonia or an ammonia wash mixture, into the treatment vessel, a mixing device inside the vessel for mixing the Biosolids or other substrate composition with the reagent, a heater system for heating the Biosolids composition, an internal vapor recovery system for recovering the vapor phase of volatile contaminants or the reagent, and a discharge mechanism for discharging the treated composition. The vessel may also include a reagent recovery system for recovering liquid reagent after it has been mixed with the composition. The apparatus is preferably a self-contained transportable unit, either mobile by having its own wheels or tracks or portable by loading on truck or trailer.

The apparatus is preferably used to further process non-recyclable Biosolids to produce acceptable land application fertilizer. For example, a composition of dewatered sewage sludge is placed into the pressure sealable treatment vessel. The pressure in the vessel may then be reduced slightly below atmospheric such that injected ammonia will transition to a gaseous state. Anhydrous ammonia is introduced to the composition in the treatment vessel via the reagent injection system. The composition is mixed by the mixing device at ambient or elevated temperatures in the presence of the ammonia gas for a time sufficient for the ammonia to reduce pathogenic microorganisms to levels acceptable under regulatory standards for land application. Heat may be applied inside the vessel to increase the rate of pathogen reduction and to thermal strip volatile toxins from the composition. The ammonia gas is then removed through the vapor recovery system, from which it may be stored or processed for further use. Any volatile contaminants removed by the vapor recovery system can be processed out of the ammonia by known filtering or extraction processes.

If the Biosolid composition contains heavy metals or non-volatile toxins, however, the process can be modified by increasing the pressure in the vessel above atmospheric levels to maintain the reagent in liquid form. The reagent injection system is then used to spray an ammonia/water mixture into the composition as it is being mixed to thoroughly wash the composition. The liquid, with its dissolved and suspended particles, is then removed by the reagent recovery system, from which it may be stored or processed for further use. Any metals or other toxins removed by the reagent recovery system can be processed out of the ammonia by known filtering or extraction processes. The mixing with the ammonia wash reagent should also be sufficient to reduce the pathogenic organisms.

After treatment by either process, particularly washing, the composition will likely contain a substantial amount of residual ammonia. This residue can be fixed as a nitrogenous fertilizer salt by mixing phosphoric acid into the decontaminated composition. This can be done inside the vessel using the mixing device to mix the acid thoroughly into the composition and elevating the temperature to speed the reaction. Any released vapor can be extracted via the vapor recovery system. Potassium and/or phosphorus and pH balancers may likewise be mixed into the composition in such ratios to the nitrogen and to each other that the composition is a balanced fertilizer.

The apparatus can also be used to treat contaminated soils and like materials. A batch of contaminated material is placed inside the sealed treatment vessel and a treatment reagent is introduced to the vessel. The preferred treatment reagent is liquid ammonia or a liquid ammonia/solvating substance mixture. The material is agitated by a mixing device in the vessel to expose it to the reagent. The process may be conducted at ambient or elevated temperatures and pressures in the vessel for a time sufficient for the treatment reagent to effectively wash or dissolve the target toxins from the material. The treatment reagent vapor and toxins in gaseous form are removed from the vessel by a vapor recovery system. The non-gaseous forms of the treatment reagent toxins are removed from the treatment vessel by a reagent recovery system. The treated material is discharged from the vessel by a discharge mechanism (e.g., a collapsible conveyor belt).

BRIEF DESCRIPTION OF THE DRAWINGS

For the purpose of illustrating the invention, there are shown in the drawings forms that are presently preferred; it being understood, that this invention is not limited to the precise arrangements and instrumentalities shown.

DETAILED DESCRIPTION OF THE PREFERRED EMBODIMENTS

Figure 1A:
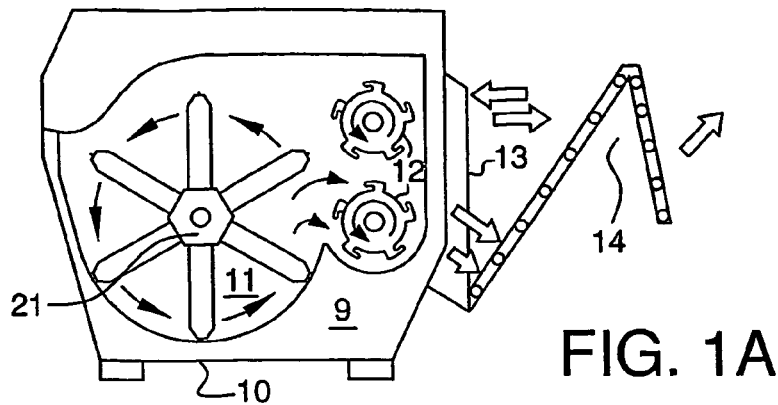
FIGS. 1A, 1B, and 1C are side views of different embodiments of the apparatus cut through to reveal the interior of the treatment vessels. Each embodiment shows a different mixing device configuration.
Figure 1B:
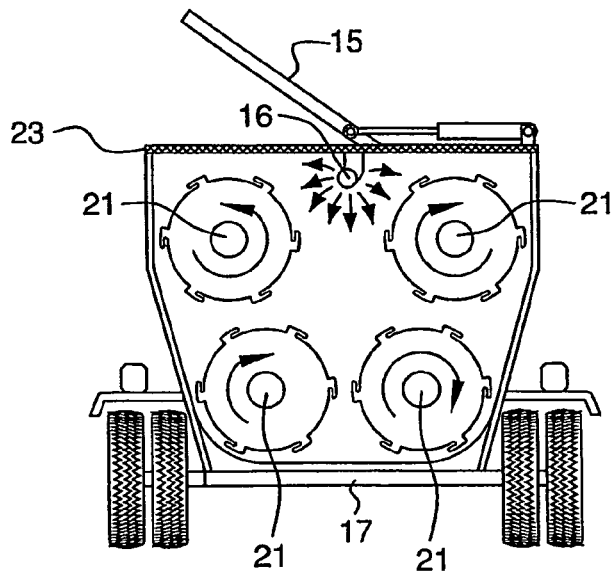
Figure 1C:
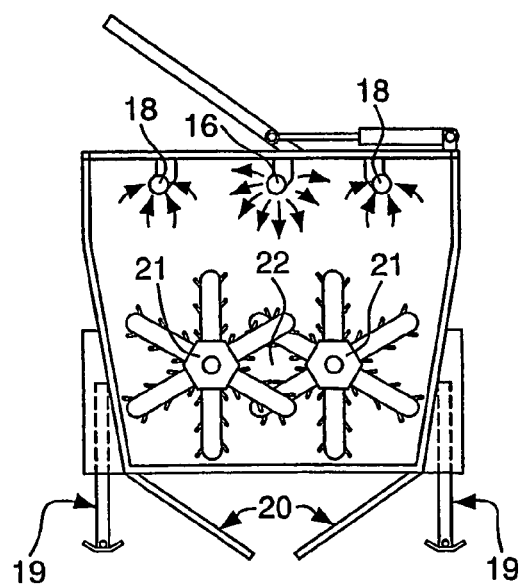

With reference to the drawings, where like numerals identify like elements, FIG. 1A depicts an embodiment of an apparatus for treating toxic materials or Biosolids in accordance with the invention. FIGS. 1B and 1C show other alternative embodiments.

Each apparatus in the embodiments of FIG. 1 includes a treatment vessel 10, 110, 210. The treatment vessel is a pressure vessel that preferably has a hydraulically actuated sealable door through which a batch of a contaminated substrate, such as Biosolids or contaminated soil may be introduced. Each apparatus has a reagent injection system, a mixing device for mixing the contaminated substrate with the reagent, a heater system, an internal vapor recovery system, a reagent recovery system for recovering the reagent after it has been mixed with the contaminated substrate, a discharge mechanism for discharging the treated substrate, and a control panel for measuring temperature and pressure in the apparatus. The exact nature of some of these elements differ between the embodiments depicted in FIGS. 1A-1C. In addition, not all elements are shown on each figure.

The hydraulically sealable door 12 allows for loading of the contaminated substrate when open, and seals the vessel when closed. The sealing of the vessel prevents leakage of solid, liquid, and gaseous contaminants or odors. The sealing also allows for the internal temperature and pressure of the treatment vessel to be adjusted and maintained. With the door 12 open, the contaminated substrate is added to the treatment vessel, preferably passing through a screen 14 at the top of the treatment vessel to prevent over sized materials from entering the vessel. The screen 14 may be stationary or vibratory. Different embodiments of the screen 14 may have different mesh sizes. It is contemplated that the exact nature of the screen 14 will depend on the characteristics of the contaminated substrate being treated.

Before, after, or concurrently with the placement of the contaminated substrate in the vessel, a treatment reagent is injected into the vessel by way of a reagent injection system 16. The reagent injection system 16 includes a system of piping 18 to convey a solid, liquid or gaseous reagent, and one or more nozzles 20 on the piping 18 from which the reagent may be released into the vessel. The reagent injection system 16 may also have valves to control the flow of the reagent. The properties of the reagent will determine the size and material of the reagent injection system.

As used herein, the term reagent encompasses not only substances that cause reactions, but also substances that dissolve another compound to form a solution (e.g., solvents). The preferred reagent for washing heavy metals and chemical toxins from the contaminated substrate is liquid ammonia and water. Liquid ammonia is superior to other existing wash and extraction mediums because of its unique solvation properties. Ammonia has many of the solvation properties of water, but also has the unique ability to dissolve many hazardous organic toxins. Further, ammonia water mixtures are excellent solvation mediums for hazardous RCRA metals such as lead and mercury. Ammonia also destroys or kills most biohazards. If ammonia is used as a reagent, it is anticipated that the reagent injection system would comprise non metallic components because of the corrosive nature of ammonia.

The contaminated substrate is mixed by a mixing device as the reagent is introduced into the vessel. The mixing is preferable accomplished by way of mixing augers located in the vessel. Various arrangements of the mixing device are contemplated. FIG. 1A shows a vessel 10 with a mixing device in the form of a main rotary paddle mixer 22. The paddle mixer 22 mixes the contaminated substrate with the reagent and can continue mixing until a substantially homogenous mixture is obtained. When the treatment is finished, a discharge chute is opened and the mixture is conveyed into a set of opposed rotary drums which commence turning and discharge of the treated mixture from the vessel.

FIG. 1B shows a vessel 110 with a mixing device in the form of four rotating mixing drums 122. In this embodiment, the drums 122 are situated such that the horizontal axes of the drums 122 are parallel to one another. The drums 122 rotate about these horizontal axes, with two of the drums 122 rotating in a clockwise direction 28 and two of the drums 122 rotating in a counterclockwise direction 30.

FIG. 1C shows a vessel 210 with a mixing device in the form of two rotary paddle mixers 222 with parallel horizontal axes. The paddles 34 of the one mixer 222 are slightly offset from the paddles 34 of the other mixer 222. The mixers may be rotated in the same direction or in different directions. This embodiment is preferred when the discharge opening 36 for the treatment material is on the bottom of the vessel as shown in FIG. 1C. When discharging the treated material, the paddles rotate in opposite directions to propel the material to the discharge opening.

Although the drawings only depict three configurations of the mixing device, the invention is not so limited. The mixing device may be a combination of these three configurations, it may be any configuration similar to one or more of the configurations shown, or it may be another known mixing configuration.

The treatment vessel also includes a heater system, as shown in FIGS. 1A, 1B, and 1C. The heater system may include conductive heating elements 38 integrally coupled with the shafts of the mixing heads. Alternatively, the heater system may use conductive heating elements 40 integrated into the paddles 34 as shown in FIG. 1C. It may also include an air injection system of nozzles for injecting hot air into the treatment vessel (not shown), or other similar means for heating the internal chamber of the treatment vessel.

For some reagent-contaminate reactions, elevated temperatures increase the reaction rate and therefore decrease the amount of time necessary for treatment. For example, treatment of contaminates with liquid ammonia or ammonia and water optimally are carried out at elevated temperatures ranging from about 10 to about 60 degrees centigrade and more specifically from about 20 to about 40 degrees centigrade. These optimal temperature ranges provide a stimulus for the ammonia reactions, thus increasing the overall reaction rate. In addition, for some contaminates, elevated temperatures and mixing may be all that is necessary to volatize and remove the contaminates (i.e., a reagent may not be necessary). For example, volatile organic chemicals, which are used in a variety of common compounds (e.g., pesticides, herbicides, gasoline, and fuel oil), readily vaporize at relatively low temperatures even without the introduction of a reagent.

While it is possible to conduct the process at higher temperatures than previously stated, such higher temperatures also mean higher operating pressures and higher energy costs. Consequently, restrictions on operating at higher temperatures are often limited by the nature of the equipment used and/or the availability of adequate energy supplies.

Figure 2:
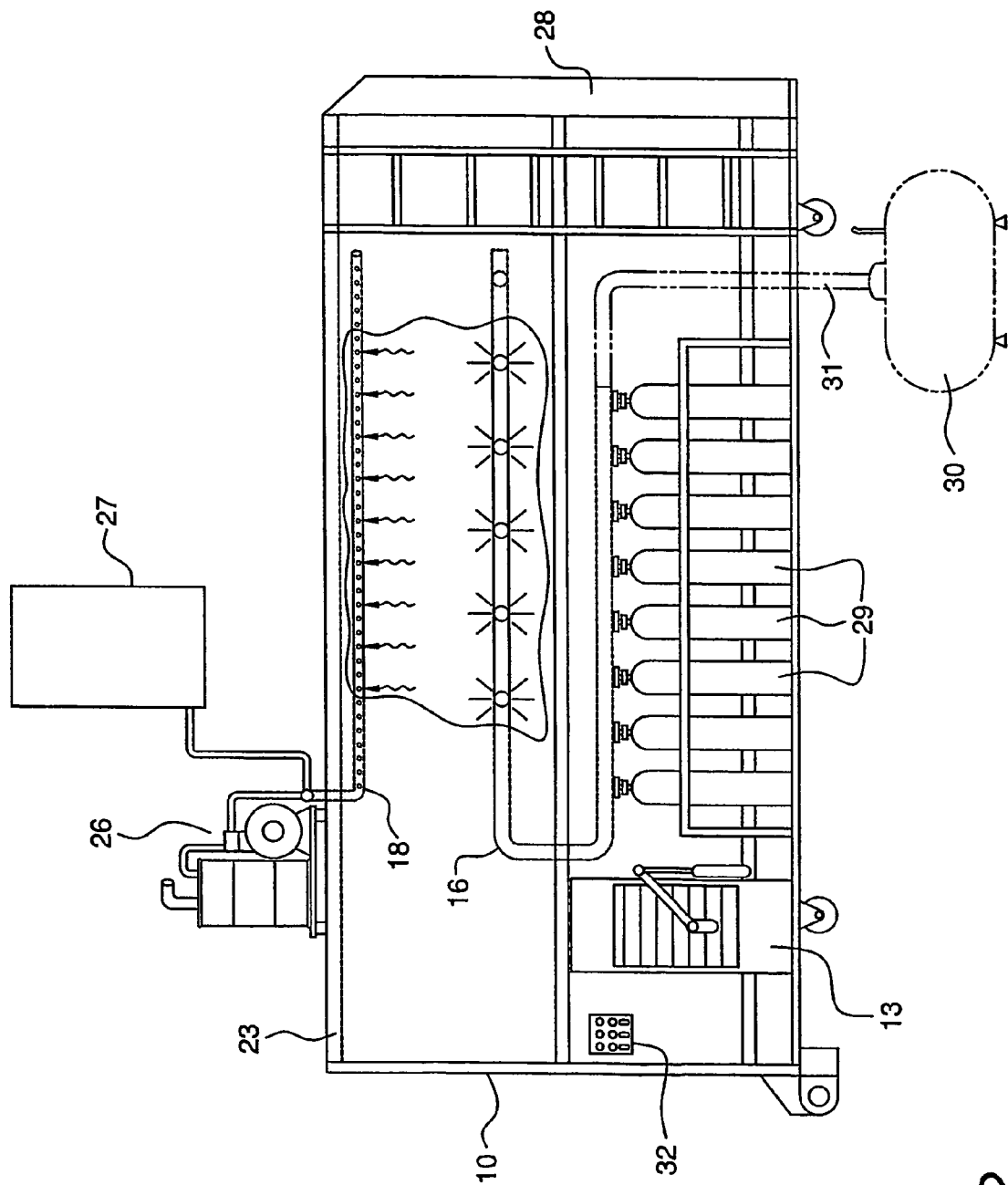
FIG. 2 is a side view of an apparatus cut through to reveal the interior treatment vessel in a "roll-off" container embodiment. This embodiment includes a vapor recovery system. This embodiment also shows the treatment reagent injection system connected to a series of reagent storage cylinders and/or a portable pressurized treatment reagent storage tank, and injection nozzles positioned on the inside of the treatment vessel.
Figure 3:
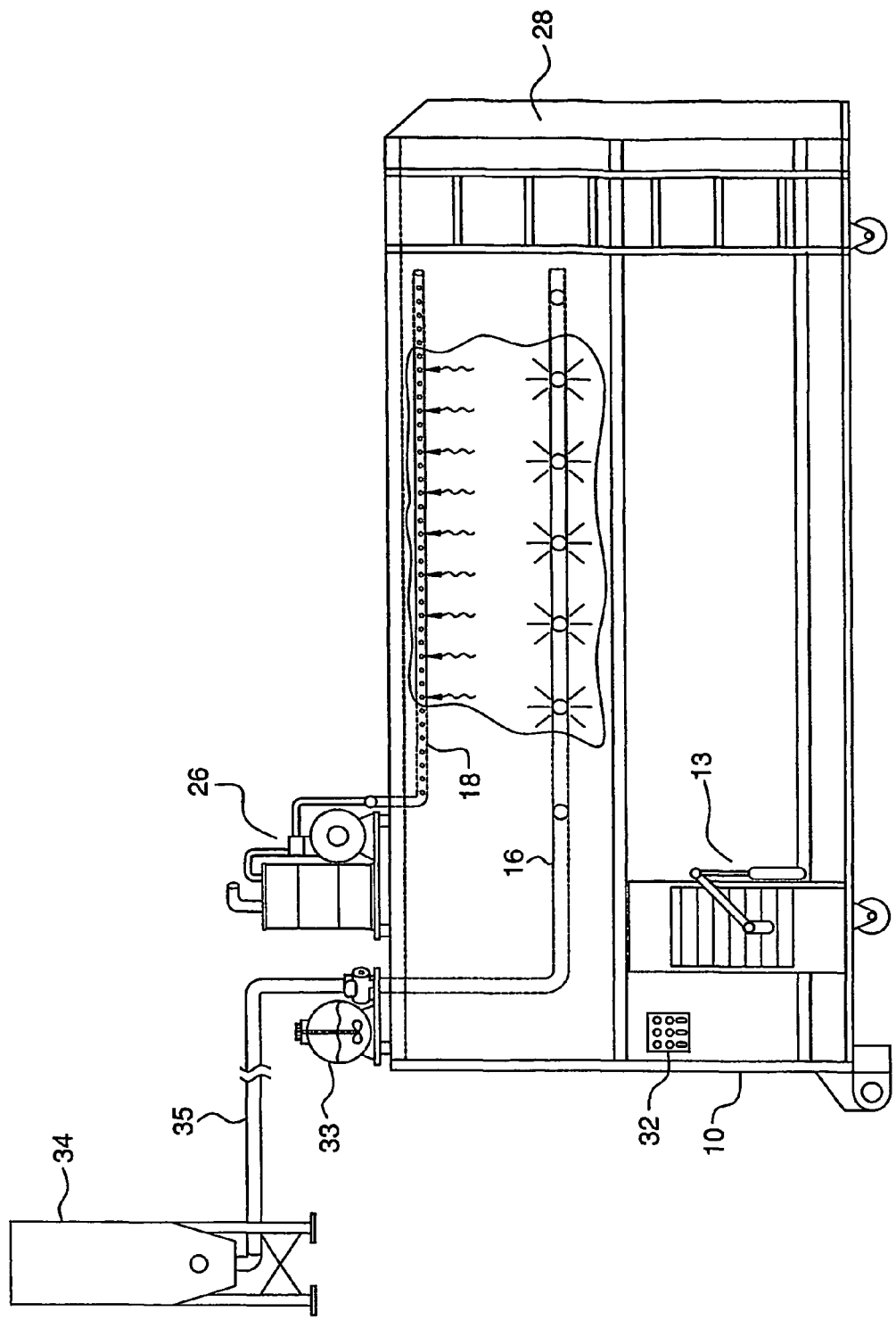
FIG. 3 is a side view of an apparatus cut through to reveal the interior treatment vessel in a "roll-off" container embodiment that includes a liquid injection system with a mix pump and tank to facilitate mixing of liquid reagents with solid reagents to create a slurry mix. The vessel can be connected to a remote storage silo or tank to hold larger volumes of the reagent. The side view also shows the vapor recovery system and injection system.

The vaporized chemicals and the gas phase of the reagent may be captured via a vapor recovery system. In one embodiment as shown in FIGS. 2 and 3, the interior of the treatment vessel includes a series of vapor recovery ports 44 installed in series at different locations in the upper level of the vessel to recover vapors. The vapors are transferred via a network of piping 46 to a vapor treatment or recovery unit. The vapor treatment or recovery unit may be a catalytic oxidizer, a thermal oxidizer, a granular activated carbon treatment vessel, or other known vapor treatment or recovery units. The exact nature of the vapor treatment or recovery unit will depend on the type of contaminate or contaminates, the concentration of those contaminates, the type of reagent employed, the available energy sources for the vapor treatment system, and other related factors.

The apparatus also includes a reagent recovery system for recovering the contaminant-laden reagent from the vessel after it has been used. After each batch treatment, the contaminant-laden reagent is separated from the substrate in the treatment vessel. Separation of the reagent may be performed by any suitable conventional means such as filtration, precipitation, decantation, centrifugation, and so on. The contaminated reagent may be stored in a separate vessel for further treatment i.e., detoxification by the introduction of an absorbent such as activated carbon, clay, ion exchange medium or any commonly known absorbent. After detoxification, the reagent is ready for a recycled use.

After removal of the vapors via the vapor recovery system, and of the contaminant-laden reagent via the reagent recovery system, the treated substrate may then be removed via a discharge mechanism. As shown in FIG. 1A, the discharge mechanism may comprise a side discharge opening 48 sealable with a door 62 that is electrically activated over a hydraulic lift mechanism. The treated substrate is then discharged via a motorized folding conveyor 50 that can be extended or articulated to deposit media into a standard container, trailer or stockpile.

Alternatively, as shown in FIG. 1C, the discharge mechanism may comprise bottom discharge doors 52 that are electrically activated to discharge the substrate through a bottom discharge opening 36. Although the embodiment is illustrated with two bottom discharge doors 52, one discharge door may be used in the alternative. The door or doors may comprise the entire bottom of the vessel or they may comprise only a portion of the bottom. The door or doors may be used in conjunction with a flat bottom vessel, a conical bottom vessel, or any other configuration that facilitates easy removal of the treated substrate.

After the treated substrate is discharged through the discharge opening 36, the substrate may be stockpiled in that location, or it may be conveyed to another area by using a conveyor or other similar mechanism.

In order to control the discharge mechanism, as well as the internal vapor recovery system, the hydraulically sealable top, the reagent injection system, the mixing device, the heater system, the internal vapor recovery system, and the reagent recovery system, a control panel 54 may be mounted on the treatment vessel. The control panel may control one or more of the above mentioned items. In addition, it is contemplated that the control panel may display the temperature and pressure of the inside of the vessel, and the conductivity of the substrate being treated.

The interior of the treatment vessel may be constructed with a double interior wall which includes an interstitial space 58. The primary interior wall 56 may comprise a chemical resistant liner to eliminate corrosion or chemical breakdown. The double interior wall also provides additional strength that allows for increased pressure within the treatment vessel. The double interior wall also provides additional strength that allows for decreased pressure within the treatment vessel, in the form of a vacuum, for use, for example, in vacuum extraction of material.

As shown in FIGS. 1A-1C, the exterior of the treatment vessel may have alternate configurations. The treatment vessel is preferably mobile or portable. As used herein, the term mobile encompasses vessels that have integral means of transport. Also as used herein, the term portable encompasses vessels that may be transported to and from a site and to various locations within the same site without significant effort and expense.

The apparatus in the embodiment shown in FIG. 1A shows a portable treatment vessel. This embodiment is contemplated to be used on skids at treatment sites, at temporary treatment facilities, at wastewater treatment facilities that have difficulty treating sludge during peak or abnormal flow conditions, and so on. This embodiment may be scaled up for use in-line at a larger scale wastewater treatment facility.

The apparatus in the embodiment shown in FIG. 1B shows a wheeled treatment vessel. This embodiment may be attached to a hitch of a car, truck or other vehicle for transport to and from a site or to different locations within the same site. It is contemplated that several of these embodiments may be used at one site. With several treatment vessels, the first one can be loaded with a contaminated substrate (e.g., contaminated soil or Biosolids), and then, once full, transported away from the contaminated area or Biosolid loading area. A second treatment vessel may then be transported to the area for loading of a second batch of a contaminated substrate while the first treatment vessel mixes and treats the first batch. The process could be repeated with a third treatment vessel or, in the alternative, the first treatment vessel may be transported back to the original area after the first batch is treated and removed from the treatment vessel.

The apparatus in the embodiment shown in FIG. 1C shows a portable treatment vessel comprising hydraulic lift rams 60 to raise the vessel above the ground surface to allow for treated substrate to be discharged through a bottom opening 36. This embodiment is beneficial on sites that have limited space. The contaminated substrate may be excavated from under the treatment vessel, placed in the treatment vessel, treated, and then discharged into the area from which it was excavated. Alternatively, a conveyor or other means for transporting the treated substrate may be placed under the bottom opening 36 allowing the treated substrate to be transported to standard container, trailer or stockpile. It is contemplated that this embodiment may be transported to and from a site and to various locations within the same site with minimal effort and expense.

This embodiment may also be used in-line at a wastewater treatment facility. The sewage sludge may be placed in the treatment vessel after, for example, a sludge dewatering press. The dewatered sludge would be treated in the treatment vessel and then discharged into a hopper or other container for storage and/or transportation of the treated sludge. More than one treatment vessel of this embodiment may be used in the wastewater treatment process. The multiple treatment vessels may correspond to the multiple lines of sludge flow or may be configured in such a manner that at least one of the vessels is receiving sludge at all times while the other or others are treating the sludge. When the one accepting sludge becomes full, the sludge flow diverts to a second vessel while the first vessel treats and discharges the material.

FIG. 2 depicts a roll off embodiment of the treatment vessel 310. The roll off embodiment 310 may be transported by tractor trailer or maybe transported by railcar. The treatment vessel 310 may be transported to a site by truck, situated at a desired location, and then dismounted from the truck. After completion of the remediation, or at any other time deemed necessary, the truck may be brought back on site and the treatment vessel 310 may be mounted onto the truck for transportation. Alternatively, the treatment vessel 310 may be mounted on a railcar, which may be particularly beneficial for remediating contaminated railroad beds where vehicle access, other than railcars, is difficult. The ability to mount the treatment vessel 310 onto a rail car also provides a convenient way in which to transport the vessel 310.

As shown in FIG. 2, the roll-off embodiment has side discharge opening 48 sealable with a door 62 comprising a folding conveyor 50. The door 62 has a lever 64 that locks and seals the opening when the door 62 or folding conveyor 50 is in a closed position and provides a means to open the door 62 and/or open and extend the folding conveyor 50. This embodiment has a vapor collection system 42 which extracts gaseous materials from the interior of the treatment vessel by way of vapor recovery ports 44 and vapor recovery piping 46. The vapor is extracted by way of a blower 66 or other similar vacuum means. The extracted vapor is transported to a storage unit 68 of a treatment unit 70, which may comprise a catalytic oxidizer, a thermal oxidizer, a granular activated carbon treatment vessel, an air scrubber, or another known vapor treatment unit.

The treatment vessel 310 also has a cylinder mounting system 72 where cylinders 74 containing liquid or gaseous reagents may be safely stored. The mounting system 72 may allow the cylinders to be connected to the reagent injection piping 18 of the reagent injection system 16. Cylinders 74 with different reagents may be stored on the mounting system 72. Alternatively, the reagent may be stored in an external portable tank 76. The portable storage tank 76 is useful for storing larger quantities of the liquid or gaseous reagent.

The treatment vessel 310 also has a separate but integral compartment 78 where the drive mechanisms are located. The drive mechanisms may provide the drive means for mixing devices, hydraulically operable top, and other devices requiring drive means. The treatment vessel 310 may further include a screen 14 for preventing larger materials from entering the vessel 310 and a ladder 80 for accessing the top of the vessel 310.

All operations and functions of the treatment vessel 310 may be controlled by an electronic control panel 54. It is contemplated that the control panel 54, in addition to controlling the operation of the treatment vessel 310, may also monitor temperature and pressure in the vessel, weight of material added to the vessel, amount of chemicals added and/or removed from the vessel, and conductivity of the substrate.

FIG. 3 depicts the roll-off embodiment 310 with a means for introducing slurry reagents into the treatment vessel 310. Dry reagents can be stored in a portable storage silo or tank 82. The dry reagents can be distributed from the silo or tank 82 via a pressurized transfer line 84 to a slurry pump mixing apparatus 86. The slurry mixing apparatus 86 comprises a mix tank, slurry pump and distribution system. After the slurry is created, the slurried reagent may be injected into the treatment vessel by way of the reagent injection system 16.

Figure 4A:
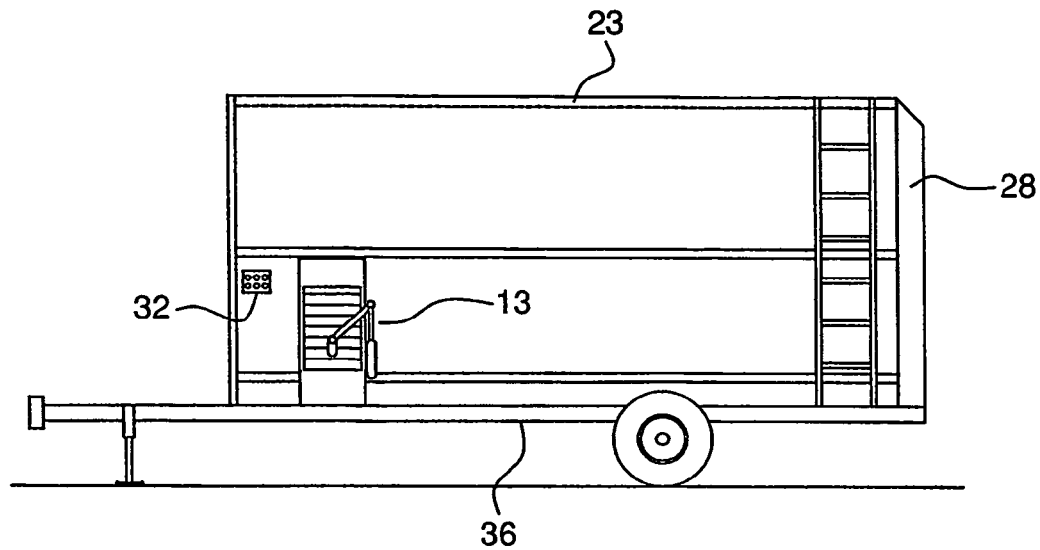
FIGS. 4A and 4B are side views of the apparatus embodied in two types of chassis mounts and drive systems, a pull trailer and straight truck configuration. The straight truck unit also contains a high volume vacuum extraction system, which can be used to excavate soils and sediments from around sensitive or difficult to access areas such as around buried utilities. The vacuum system has a swinging flexible vacuum extension, which is positioned to reach areas with limited access.
Figure 4B:
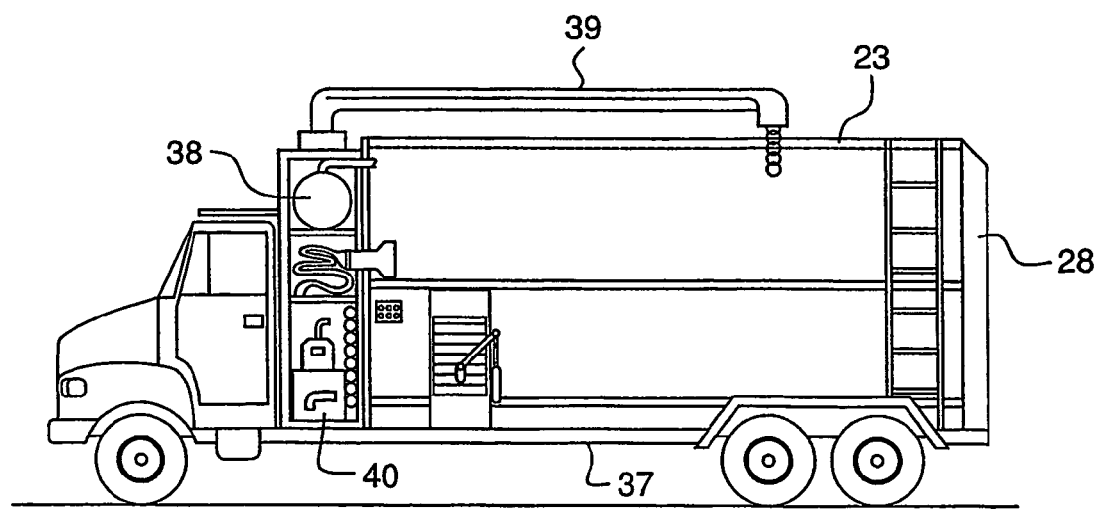

FIG. 4A depicts a trailer embodiment of the treatment vessel 410. The treatment vessel may include a trailer tongue 85 with a coupler 87 in either a hand wheel type or a lever type. FIG. 4B depicts an embodiment of the treatment vessel, wherein the treatment vessel 510 is integrally coupled with a truck or tractor.

The treatment vessel 510 further includes a high volume vacuum excavation system 88 and a condenser unit 90. The vacuum excavation system 88 includes a vacuum pump and drive means 92, a hose 94, and a rotating mast 96. This vacuum excavation system 88 facilitates high-pressure excavation of areas that are difficult to access with traditional excavation equipment, for example, contaminated media surrounding buried utilities. Because of the maneuverability of the hose 94 and the strong suction power of the system 88, the system 88 can excavate these areas without disruption and damage to nearby items such as utilities. The vacuum system 88 also contains a rotating mast 96, which permits the vacuum excavation system 88 to extend to areas that are not easily accessible by vehicle. The mast 96 connects to a series of special vacuum hoses and may be rotated over the area of excavation, wherein the vacuum hoses are situated to remove the contaminated material. The mast 96 facilitates vacuum excavation without the need to have the hose running through the contaminated area.

The embodiment also includes a condenser unit 90 for the collection, separation and treatment of vapor and liquid contaminants separated from media by the treatment process. A condenser unit is particularly beneficial in treatment processes for treatment of, for example, manufactured gas plant (MGP) waste, also known as coal tar and it constituents.

Figure 5A:
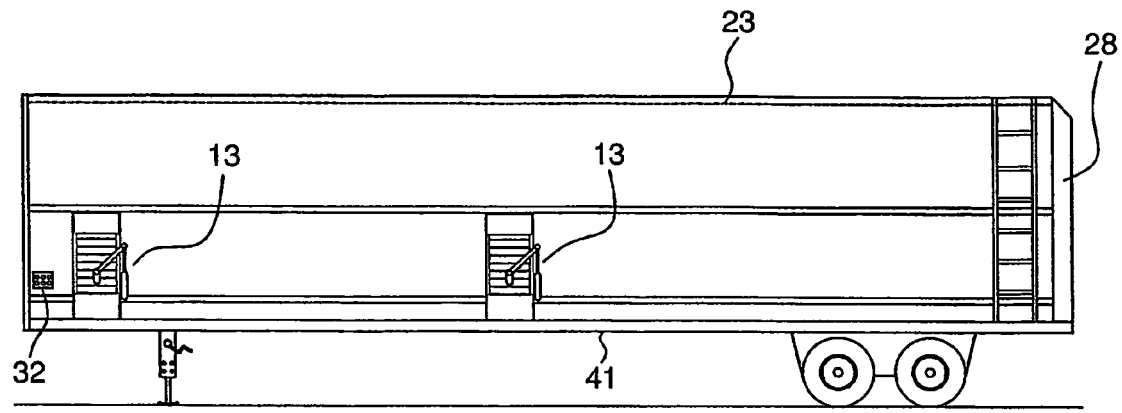
FIGS. 5A and 5B are side views of two additional embodiments of the apparatus. In the embodiment shown in FIG. 5A, the treatment vessel is a long trailer typically pulled and placed by a tractor truck. In the embodiment shown in FIG. 5B, the treatment vessel is track mounted and is controlled by remote means.

FIG. 5A depicts an embodiment of the treatment vessel, wherein the treatment vessel 610 is a trailer typically pulled and spotted by a tractor-trailer truck. The long trailer embodiment 610 has the same features as other embodiments and may also contain multiple power sources and multiple discharge openings 48.

Figure 5B:
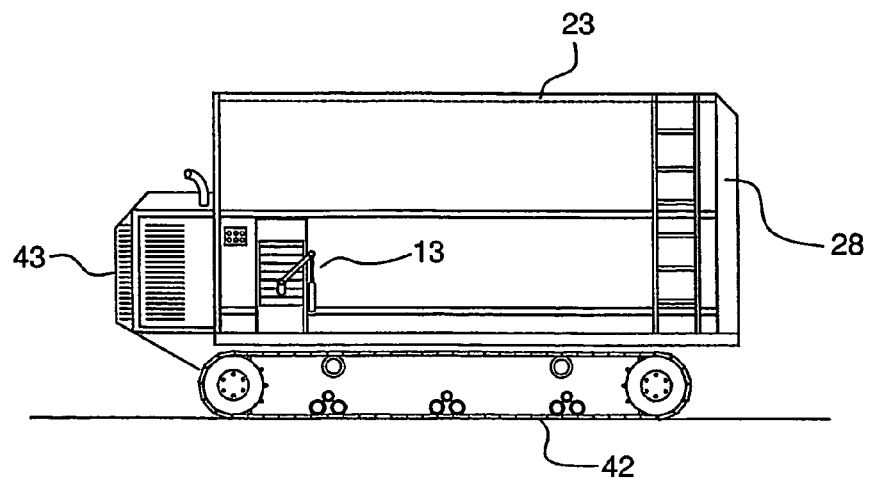

FIG. 5B depicts an embodiment of the treatment vessel, wherein the treatment vessel 710 is configured on a self propelled remote controlled track mounted configuration 98. This embodiment contains an integral power unit 100 consisting of a combustion engine, an electric/hydraulic distribution, and a drive system. The track unit can be remotely controlled at a site and placed in close proximity to the contaminated zone where media is extracted for treatment. The remote controlled excavation facilitates remediation of a contaminated area with limited intrusion into the contaminated area by remediation personnel.

Figure 6:
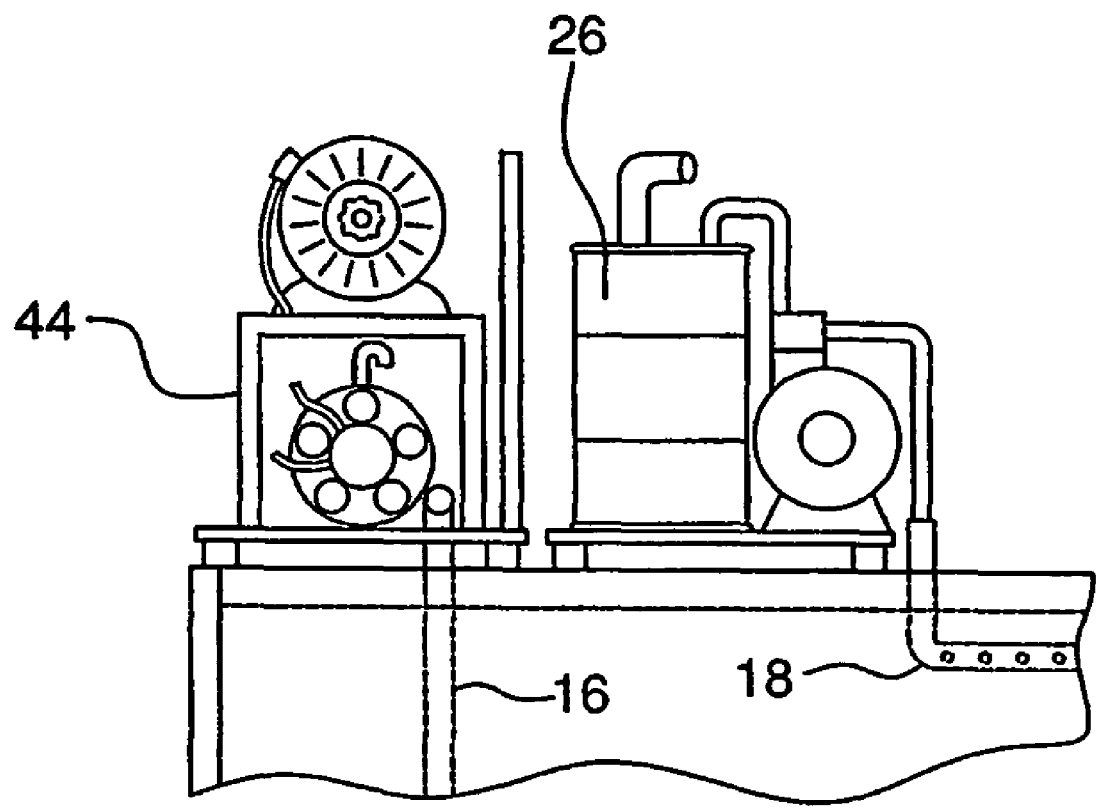
FIG. 6 is a side view of a cal rod thermal injection blower system connected to the reagent injection system also utilizing the vapor extraction system for emission and odor collection and treatment.

FIG. 6 depicts a heat injection system 102 including a mounting frame, cal rod heater system, a regenerative blower/vacuum system, electrical distribution and control panels and high temperature heat fittings connected to the plurality of interior injection systems 104. Dry heat is generated through the electrical powering of the system, followed by injection of the heat into the treatment vessel at varying temperatures and pressures. The heat acts as a reagent, volatilizing contaminated substrates such as polluted soils, sludge, sediments and Biosolids. The piping network 104 for the heat injection system may be the same as the piping network 18 for the reagent injection system. During treatment of contaminated substrate, contaminated vapors are recovered and treated through the vapor recovery system 42, which comprises a regenerative vacuum unit 66 for recovery through the interior lines 46, and treatment of air stream contaminants through activated carbon units, catalytic/thermal oxidizers, and the like.

The invention also relates to a method of treating toxic material and Biosolids preferably using an embodiment of the apparatus described above. The preferred method comprises the steps of placing a batch of a solid or semi-solid contaminated substrate into a treatment vessel comprising an agitating means and a reagent injection means; introducing a treatment reagent into the treatment vessel via the reagent injection means; using the agitating means of the treatment vessel to agitate the contaminated substrate and the treatment reagent at ambient or elevated temperatures and at atmospheric or elevated pressures in the vessel for a time sufficient for the treatment reagent to extract in excess of 60% of the toxin from the substrate; removing the contaminant-laden (toxin-laden) reagent from the treatment vessel; removing the toxins from the reagent such that the reagent can be recycled for reuse; and removing the residue of the batch substrate from the treatment vessel.

Before or during mixing, an optional step of reducing the particle size of the contaminated substrate may be employed. Reducing the particle size increases the exposed surface area of the material, which in turn allows for greater exposure to the reagent. The particle size can be reduced by, for example, milling the soil in-situ to create small particles. Smaller particular size has been found to be particularly beneficial in weathered soils (e.g., soil comprised mainly of rock, gravel, and sand) contaminated with PCBs. The reduced particle size (and resulting increased surface area) of the contaminated weathered soils are more amenable to PCB extraction than their non-reduced counterparts. Further, it has been found that there is a much improved extraction in substrates milled to a −20 mesh.

Another optional step entails the removal of water or moisture from the contaminated substrate prior to treatment. The removal of water or moisture allows for greater efficiency of the reagent. Water dilutes many of the contemplated reagents, reducing the reagents' concentration in the treatment vessel, and thus reducing the reagents' ability to effectively remove the contaminates from the substrate. A preliminary step of removing the water reduces the dilution and thus increases the effectiveness of the reagent. The removal may be performed as a preliminary step by one or more conventional means such as air drying, filter pressing, or heat drying. A preferred pretreatment for use with contaminated soil sites uses an apparatus such as described in U.S. Pat. No. 5,830,752 to mix and heat the soil in-situ to remove a significant amount of the water.

The method may also be performed with the optional pretreatment step of improving the solubility of certain metal species in the substrate by using acid or base addition. In this step, substrates contaminated with hazardous metals are pretreated with a base or an acid such as nitric acid. If a sufficient amount of acid is used, the acid converts the metal components into acid salts such as nitrate salts. Although sulfuric and phosphoric acid may be employed, it is preferred that nitric acid be utilized if ammonia is the reagent of choice, because nitrate salts have a higher solubility in ammonia.

Regardless of whether the method is applied to treating toxic materials at a remediation site or Biosolids at a wastewater treatment plant, the treatment vessel used in the method is preferably an embodiment of the treatment vessel discussed in detail above. However, alternate treatment vessels may be employed provided that they have a means for mixing the substrate, heating the substrate, and adding a reagent to the substrate.

As noted above, the selection of the reagent will be contingent on conditions such as composition of the substrate and composition of the toxic materials or Biosolids. However, the most efficient and economic processes disclosed herein for the vast majority of conditions involve the use of ammonia and water. Liquid ammonia is readily available, because it is employed as a fertilizer in agricultural operations. Consequently, it is also relatively inexpensive.

Ammonia boils at −33 degrees centigrade requiring in some cases cooling and/or that the solutions be pressurized. In some cases, it may be advantageous to combine the ammonia with another solvating substance such as mineral oil or a hydrocarbon such as hexane. The selection of the co solvent used will be dictated by the nature of the toxin to be removed.

In carrying out the method of this invention, the ratio of ammonia or ammonia solution to contaminated substrate is preferably between about 0.25/1 and 1000/1 on a weight basis and more preferably between 1/1 and 5/1.

The combination of the apparatus of the invention with ammonia reagent is preferably used to further process the contaminated substrate to produce acceptable land application fertilizer. For example, a composition of dewatered sewage sludge is placed into the pressure sealable treatment vessel. The pressure in the vessel may then be reduced slightly below atmospheric such that injected ammonia will transition to gaseous state. Anhydrous ammonia is introduced to the composition in the treatment vessel via the reagent injection system. The composition is mixed by the mixing device at ambient or elevated temperatures in the presence of the ammonia gas for a time sufficient for the ammonia to reduce pathogenic microorganisms to levels acceptable under regulatory standards for land application. Heat may be applied inside the vessel to increase the rate of pathogen reduction and to thermal strip volatile toxins from the composition. The ammonia gas is then removed through the vapor recovery system, from which it may be stored or processed for further use. Any volatile contaminants removed by the vapor recovery system can be processed out of the ammonia by known filtering or extraction processes.

Further treatment of the solid material may be desirable to bring the level of the residual toxin down below a target such as a regulatory criterion. Repeated treatment of the solid matrix with ammonia or ammonical solutions as described above can be performed under similar operating conditions. Repeated treatment will further reduce the contaminant concentration and may be necessary if the original treatment does not bring the contaminate concentration below the desired goal (e.g., regulatory limit, site-specific clean-up criteria).

If the Biosolid composition contains heavy metals or non-volatile toxins, however, the process can be modified by increasing the pressure in the vessel above atmospheric levels to maintain the reagent in liquid form. The reagent injection system is then used to spray an ammonia/water mixture into the composition as it is being mixed to thoroughly wash the composition. After each treatment, the ammonia/water mixture, with its dissolved particles, is separated from the composition in the treatment vessel and removed by the reagent recovery system, from which it may be stored or processed for further use. Separation of the ammonical solutions can be performed by conventional means such as filtration, precipitation, decantation, and centrifugation and so on. The ammonical solutions containing the toxins can be combined into a separate vessel for further treatment, i.e., detoxification by introducing an absorbent such as activated carbon, clay, ion exchange medium or any commonly known absorbent. After detoxification, the ammonia or ammonical solution may be used for treatment of additional contaminated substrate. Any metals or other toxins removed by the reagent recovery system can be processed out of the ammonia by known filtering or extraction processes. The mixing with the ammonia wash reagent should also be sufficient to reduce the pathogenic organisms.

Again, further treatment of the solid material under the same or similar conditions may be desirable to bring the level of the residual toxin down below a target such as a regulatory criterion.

After treatment by either process, particularly washing, the composition will likely contain a substantial amount of residual ammonia. This residue can be fixed as a nitrogenous fertilizer salt by mixing phosphoric acid into the decontaminated composition. This can be done inside the vessel using the mixing device to mix the acid thoroughly into the composition and elevating the temperature to speed the reaction. Any released vapor can be extracted via the vapor recovery system. Potassium and/or phosphorus and pH balancers may likewise be mixed into the composition in such ratios to the nitrogen and to each other that the composition is a balanced fertilizer.

Although this post treatment step of fixing the residual ammonia is discussed with substrates generally, the step is particularly beneficial with Biosolids. Prior to treatment, the Biosolids have many of the organic characteristics necessary to make effective fertilizer, but may contain toxic materials such as heavy metals or pathogens at levels above the regulatory limits for disposal as fertilizer. After treatment, the contaminated materials have been removed and the Biosolid material is nitrogen rich from the ammonia wash treatment. The residual ammonia may be fixed by the introduction to the treated Biosolids of one or more of nitric acid, phosphoric acid, or sulfuric acid.

To create a commercial grade fertilizer, phosphorus and potassium may also be added to the treated Biosolids. The phosphorous may be added by the addition of phosphoric acid and the potassium may be added by the addition of potassium chloride, but other means are available. The amount of phosphorous and potassium to be added is dependent on the original concentration of nitrogen in the treated Biosolids, and the desired ratio of nitrogen to phosphorous to potassium in the fertilizer. Typical ratios include 1-1-1, 1-2-1, 1-2-3, 3-1-1, and so on. The mixing and blending of these ammonia salts, phosphorous and potassium into the Biosolid can be done inside the treatment vessel by the mixing device.

Steps in the method of the present invention will be further clarified by reference of the following examples.

Example 1

Contaminated sludge from a New England harbor was dredged using conventional means. The sludge was heat dried to remove residual water. 56.1 grams of the dried sludge was placed in a pressure treatment vessel and the vessel was charged with 1000 ml of anhydrous ammonia. The temperature was increased to 40° C. and held there for 30 minutes while stirring at 800 rpms. The ammonia was drained by filtration from the sludge and the sludge analyzed for residual organics. Table I lists the results.

| Contaminant | Starting Material (ppm) | Washed Material (ppm) |
| --- | --- | --- |
| PCB | 9453 | 338 |
| Anthracene | 7.2 | ND |
| Benzopyrene | 8.5 | ND |
| 1,3 dichlorobenzene | 31 | 4.7 |
| Pyrene | 14 | 5.4 |

Example 2

The solid material from example 1 was washed a second time using the same procedure described in example 1. The twice washed material had a residual PCB level of 23 ppm.

Example 3

The solid material from example 2 was washed a third time using the same procedure as described in example 1. The thrice washed material had a residual PCB level of 0.2 ppm.

Example 4

Soil was excavated in a conventional manner from a site in Texas. The soil was doped with 500 ppm of PCB. 54.4 grams of the doped soil was added to a treatment cell along with 1000 ml of anhydrous ammonia. The mixture was stirred at 800 rpms for 5 minutes. The ammonia was filtered away from the solid soil matrix. The residual soil was analyzed for PCB and found to contain 7 ppm PCB.

Example 5

Weathered soil containing dioxins and pentachlorophenol was obtained from a West coast industrial site using conventional excavation techniques. 120 grams of the soil was dried by heat treatment to remove residual water, and then placed in a treatment cell. 1000 ml of anhydrous ammonia was added and the mixture was stirred at 800 rpms for 10 minutes. The ammonia was filtered away from the soil and the soil was analyzed for pentachlorophenol and dioxins. Table II lists the results.

| Contaminant | Starting level ppm | Treated level PPM |
| --- | --- | --- |
| Pentachlorophenol | 42 | 3 |
| Dioxin | .9 | .005 |

Example 6

50.4 grams of activated sludge from a municipal sewage treatment plant was placed in an open beaker. 120 mL of anhydrous ammonia was added. The mixture was stirred at ambient temperature and atmospheric pressure. Prior to treatment with ammonia, the sludge was analyzed for coliform and found to contain a concentration too numerous to count. After treatment with ammonia, the resultant solid material was analyzed for coliform and none was detected.

Example 7

100 grams of raw sewage sludge from a Northeast municipal treatment plant was treated with 10 mL of anhydrous ammonia with stirring. After treatment the sludge was analyzed for E. Coli bacteria and total coliform. The treated material was found to have <1 MPN/100 mL. An untreated control was found to contain >200 MPN/100 mL of both bacterias.

Example 8

One ton of sludge from a commercial bakery process is placed in a conventional roll-off container or treatment vessel. The sludge contained approximately 60% solids. Using the MITU processing equipment, 120 pounds of anhydrous ammonia was added with MITU mixing. The mixture was mixed for 30 minutes. 167 pounds of phosphoric acid and 200 pounds of potassium chloride was added and mixing was continued for 30 minutes. The entire batch was dried using the MITU drying process to yield 1,687 pounds of fertilizer having 10/10/10 N/P/K.

As indicated above, the methods of the invention can be carried out at a fixed plant or using a mobile apparatus. The drawings show several embodiments of a mobile apparatus. However, it should be understood that the various elements of the apparatus can be used in or at a fixed facility as well.

While the invention has been described in conjunction with various embodiments, they are illustrative only. Accordingly, many alternatives, modifications and variations will be apparent to persons skilled in the art in light of the forgoing detailed descriptions, and it is therefore intended to embrace all such alternatives, modifications and variations as to fall within the spirit and scope of the invention.

We claim:

1. A method of treating a Biosolid composition contaminated with one or more pathogenic microorganisms comprising the steps of:
    placing the composition into a pressure sealable treatment vessel having a reagent injection system, a mixing device, a heating system, and a vapor recovery system;
    controlling the pressure or temperature in the vessel such that anhydrous ammonia inside will exist in a substantially gaseous state;
    injecting anhydrous ammonia into the vessel through the reagent injection system;
    mixing the composition in the presence of anhydrous ammonia using the mixing device to kill at least a portion of the pathogenic microorganisms in the composition; and
    recovering anhydrous ammonia gas that has not reacted in the composition through the vapor recovery system;
    introducing phosphoric acid into the vessel following the step of mixing the composition in the presence of anhydrous ammonia; and
    mixing the composition with the phosphoric acid using the mixing device to convert residual ammonia in the composition into a nitrogenous fertilizer salt.

2. The method of claim 1, wherein the Biosolid composition is selected from the group consisting of: a sludge from a sewage or wastewater treatment facility; a sludge comprising residue of production matter from a food processing facility and a sludge comprising waste matter from a livestock processing facility.

3. The method of claim 1, wherein the treatment vessel is adapted for mobility, the method further comprising the step of:
    transporting the treatment vessel from a first site to a second site at which a supply of the composition is located.

4. The method of claim 3, wherein the treatment vessel includes wheels to facilitate the mobility of the vessel.

5. The method of claim 4, wherein the vessel includes a lift mechanism adapted to elevate the vessel with respect to a support surface, the method further comprising the step of:
placing the vessel on a support surface at the second site;
elevating the vessel with respect to the support surface using the lift mechanism to facilitate discharge of the composition from the vessel; and
discharging the composition from the vessel.

6. The method of claim 1 further including the step of:
dewatering the composition using the heating system prior to the step of injecting anhydrous ammonia into the vessel.

7. The method of claim 1, wherein the vessel includes a filter arranged for receipt of the composition, and wherein the step of placing the composition into the vessel includes the step of directing the composition through the filter.

* * * * *